United States Patent
Hooley

(10) Patent No.: US 9,633,294 B2
(45) Date of Patent: Apr. 25, 2017

(54) OPTICAL CODE

(71) Applicant: Smartglyph Limited, West Yorkshire (GB)

(72) Inventor: Martin Hooley, West Yorkshire (GB)

(73) Assignee: Smartglyph Limited, West Yorkshire (GB)

( * ) Notice: Subject to any disclaimer, the term of this patent is extended or adjusted under 35 U.S.C. 154(b) by 0 days.

(21) Appl. No.: 14/780,610

(22) PCT Filed: Mar. 26, 2014

(86) PCT No.: PCT/GB2014/050966
§ 371 (c)(1),
(2) Date: Sep. 28, 2015

(87) PCT Pub. No.: WO2014/155115
PCT Pub. Date: Oct. 2, 2014

(65) Prior Publication Data
US 2016/0063369 A1 Mar. 3, 2016

Related U.S. Application Data

(60) Provisional application No. 61/805,585, filed on Mar. 27, 2013.

(51) Int. Cl.
*G06K 19/06* (2006.01)
*G06K 7/12* (2006.01)

(52) U.S. Cl.
CPC ......... *G06K 19/06037* (2013.01); *G06K 7/12* (2013.01); *G06K 19/0614* (2013.01); *G06K 19/06046* (2013.01)

(58) Field of Classification Search
CPC ............... G06K 19/06037; G06K 7/12; G06K 19/06046; G06K 19/190614
(Continued)

(56) References Cited

U.S. PATENT DOCUMENTS

| | | | |
|---|---|---|---|
| 5,748,868 A * | 5/1998 | Echigo | G06K 7/14 345/619 |
| 2006/0091215 A1* | 5/2006 | Uchiyama | G06K 19/06037 235/462.1 |

(Continued)

FOREIGN PATENT DOCUMENTS

| | | |
|---|---|---|
| EP | 0 689 152 A2 | 12/1995 |
| EP | 1 847 945 A2 | 10/2007 |

OTHER PUBLICATIONS

International Search Report and Written Opinion for corresponding patent application No. PCT/GB2014/050966 dated Jul. 1, 2014.

*Primary Examiner* — Paultep Savusdiphol
(74) *Attorney, Agent, or Firm* — Renner, Otto, Boisselle & Sklar, LLP

(57) ABSTRACT

An optical code, a method for encoding data according to said code, and a method for reading data encoded according to said code. The code formed of an array of equal-size elements, each element being the smallest representation of a data value. Elements being one of the following types of element; a first type where the entire area of the element is a single color, a second type where the area is divided into at least two portions and each portion being a respective color. The array having at least one of the second type of element.

14 Claims, 4 Drawing Sheets

(58) Field of Classification Search
USPC .................................... 235/437, 494, 462.1
See application file for complete search history.

(56) References Cited

U.S. PATENT DOCUMENTS

| | | | |
|---|---|---|---|
| 2007/0125862 A1* | 6/2007 | Uchiyama | G06K 19/06037 235/462.09 |
| 2008/0002853 A1* | 1/2008 | Kawabe | G06K 19/06028 382/100 |
| 2013/0140354 A1* | 6/2013 | Fan | G06K 19/06037 235/375 |

* cited by examiner

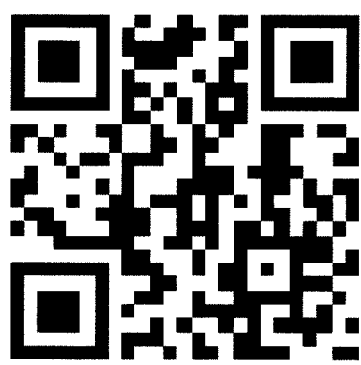
Fig. 1
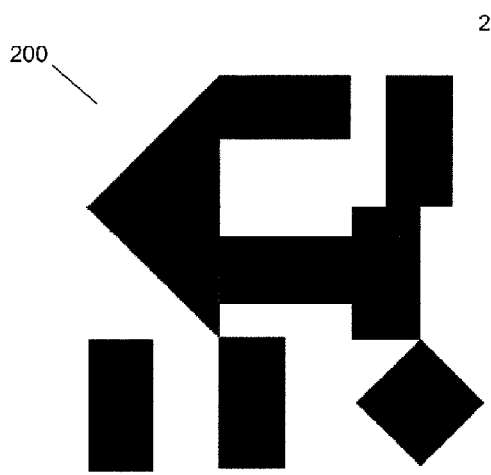
Fig. 2-a
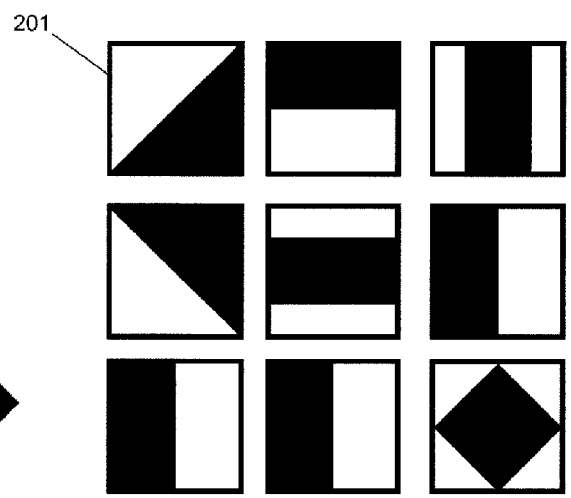
Fig. 2-b

Fig. 3
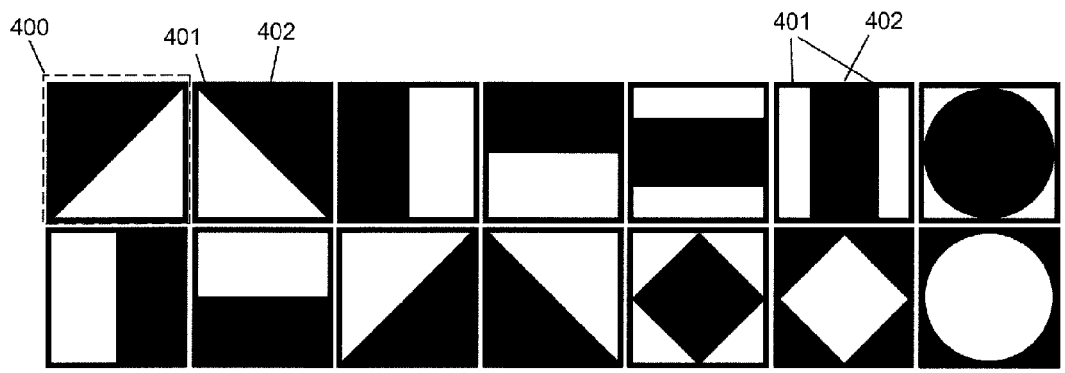
Fig. 4-a
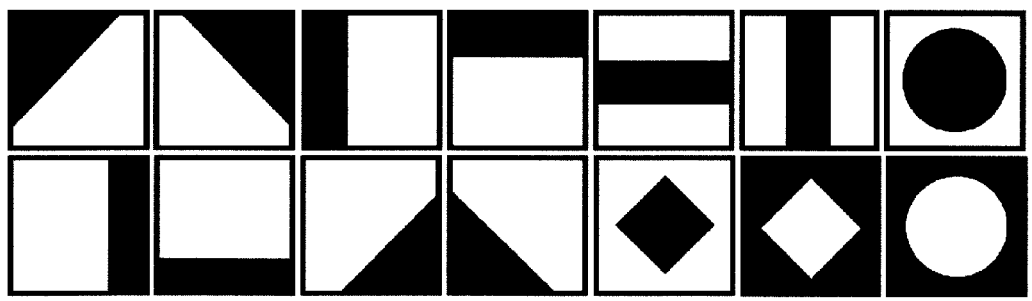
Fig. 4-b
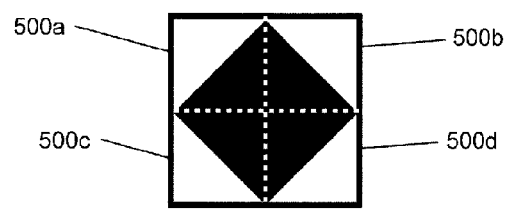
Fig. 5

OPTICAL CODE

This application is a national phase of International Application No. PCT/GB2014/050966 filed Mar. 26, 2014 and published in the English language, which claims benefit to U.S. Provisional Patent Application No. 61/805,585 filed Mar. 27, 2013, which are hereby incorporated herein by reference in their entirety.

The present invention relates to optical codes.

The field of optical codes have been largely dominated by the Quick Response or "QR" code, an example of which is shown in FIG. 1. QR codes were originally designed and engineered for use in inventory and factory settings, to allow robotic units to identify entities optically. QR codes are used to store what is referred to as active data. In this context, active data is information which, when taken in isolation has meaning. In contrast, inactive or passive data contains no meaningful data in isolation; the passive data only acts as a reference or pointer to active data stored elsewhere.

However, QR codes commonplace use as carriers for data in a more domestic setting is rife with problems. For example, a high resolution camera phone is required to be able to quickly and accurately read a QR code. This inherently excludes users of older devices (known as "feature phones"). Further, the user is required to hold the phone very still, as the read can take an appreciable number of milliseconds. These factors lead to obvious frustration.

The present invention aims to provide a quicker reading and/or more accurate, optical code.

Reference throughout this specification to "one embodiment" or "an embodiment" means that a particular feature, structure, process, block, or characteristic described in connection with an embodiment is included in at least one embodiment of the present invention. Thus, the appearance of the phase "in one embodiment" or "in an embodiment" in various places throughout the specification does not necessarily mean that the phrases all refer to the same embodiment. The particular features, structure, or characteristics may be combined in any suitable manner in one or more embodiments. Further, the present invention has been described with reference to embodiments; modifications of these embodiments, further embodiments and modifications thereof will be apparent to the skilled person and as such are within the scope of the invention.

In its most general form, the present invention provides an optical code which comprises combinations of relatively simple geometric shapes, combined to form a readily readable code. The code preferably contains passive data.

Accordingly, in a first aspect, the present invention provides a two dimensional code formed of an array of equal-area elements, each element being the smallest representation of a data value, wherein each element is one of the following types of element:
  a first type wherein the entire area of the element is a single colour;
  a second type wherein the area is divided into at least two portions, each portion being a respective colour,
  wherein the array has at least one of the second type of element.

The advantages provided by such a code are clear. In comparison to the prior art, the optical code of the present invention provides a substantially easier and consistent read by a scanning device, due to the contrast provided by such divisions of elements.

In an embodiment of the present invention, the respective colours of the second type of element are different colours. For example, a first colour may be black, and a second colour white, or a first colour may be red, and a second colour blue.

In an embodiment of the invention, there may exist a ratio between the area of the element and an area of the first of the at least two portions being greater than 0 and less than 1, alternatively the ratio may exist being greater than 0.1 and less than 0.9, alternatively the ratio may exist being greater than 0.2 and less than 0.8, alternatively the ratio may exist being greater than 0.3 and less than 0.7, alternatively the ratio may exist being greater than 0.4 and less than 0.6, or alternatively the ratio may exist as 0.5.

In an embodiment of the invention, the division of the second type of element may be such that there exists an average pixel value being between greater than 0 and less than 1. In this context, an average pixel is the averaged value of pixels representing an optically captured element.

An example of an average value used is a greyscale value; notionally the value 1 is assigned to 100% white, and 0 is assigned for 100% black. Thus the varying degrees of grey can be identified through reference to a number between 0 and 1. In this example, if the element is an element of the second type, and the first colour is white (pixel value 1) and the second colour is black (pixel value 0), in an example where the element is divided into two equal portions the average pixel value would be 0.5. Similarly, if the element was divided into a portion being ¼ and a portion being ¾, the average pixel value would be ¾.

In an alternative example, pre-processing may be used to give a best case for comparison. In this example, associated error bars are used to identify which pixels may be considered white, for example pixels between 0.9 and 1.0 may be considered white (value 1) and any pixels between 0 and 0.9 may be considered black (value 0). By doing this, errors that may be introduced during read are negated (grey values are considered black etc.) and a best case is presented for validation. To give an example in 8-bit colour values, any pixel with a value less than or equal to 200, 200, 200 may be considered black by the scanning device and any pixel with a value greater than 200, 200, 200 may be considered white by the scanning device.

Validation may then proceed through fuzzy image comparison, utilizing known methods to compare the un-validated element to known elements stored in the scanning device. Such methods generally return a % likeliness value, which can be compared to a control value. For example, it may be that the scanning device accepts 60% alike as a valid element. Thus if the pre-processed element is more than 60% alike to a known stored element, the un-validated element is considered validated. Alternatively if the pre-processed element is less than 60% alike, the scanning device will reject the element, and may request the user to re-capture the element so as to retry validation. This percentage likeliness can of course be represented as a decimal, and so may be an average pixel value as described above.

Alternatively, as an example, 8-bit colour values may be used (i.e. RRR, GGG, BBB). In this example, black has the value 0, 0, 0 and white 255, 255, 255. In this example, for an element of the second type, divided in two, the average value would be 128, 128, 128. Further this value can be normalised: Value/Maximum Value≈Normalised average value or 128/255≈0.5; thus the average value as discussed previously is given. Broadly, the average pixel value is analogous to the ratio as discussed previously.

A person skilled in the art will appreciate that values given in the above are for illustrative purposes and may be decided based on a plurality of factors.

In the same or any other embodiment of the invention, the area may be divided such that at least one portion forms a simple shape. The simple shape may be selected from the group consisting of: triangles, squares, rhombuses, rectangles etc. A person skilled in the art will appreciate that any simple shape may be used, such as demonstrated in FIG. 4.

In a further embodiment of the present invention, the element is split such as to form two equally sized portions, i.e. the element is 50% one colour and 50% a colour different to the first.

In yet the same or any other embodiment of the invention, the element may be divided such as to possess at least one degree of symmetry; alternatively the element may be divided such as to possess at least two degrees of symmetry; alternatively the element may be divided such as to possess at least three degrees of symmetry. A degree of symmetry may be one or more of rotational, reflectional or translational.

In yet the same or any other embodiment of the invention, the element may be divided such as to give a marked contrast between respective portions. A person skilled in the art would appreciate that clearly a division wherein a negligible second portion is produced would not meet the criteria that there is a marked contrast. Further the contrast required may be determined by the resolution of the device which is to be used to scan the code. In a similar embodiment, a contrast is given by having adjacent portions having non-complimentary colours.

In an embodiment of the invention, the first respective colour of the second type of element is black and the second respective colour of the same type of element is white.

In an embodiment of the present invention, the data stored within the code is not active data. This allows the code to be displayed in a significantly reduced footprint, whilst maintaining a high degree of storage. In a further embodiment of the present invention, the data stored within the code is non-binary in format. Further, the removal of active data (data which in isolation has meaning) allows the code of the present invention to effectively contain near unlimited amounts of data through referencing to a central server. In comparison, QR codes of the prior art are limited in the amount of data which they can contain.

In an embodiment of the present invention, 13 unique elements are utilized, wherein 12 of the 13 unique elements are approximately 50% one colour and 50% a colour different to the first.

In an embodiment of the present invention, the division may be such as to split the element into at least two equally sized portions. In a similar embodiment, a portion may be considered to be a plurality of non-contiguous sub-portions each being a same colour. In other words, a portion may be considered to be all of the parts of an element being the same colour. In a similar embodiment, a portion may additionally be considered to be a contiguous portion being a same colour.

In an embodiment of the present invention, elements of the second type may be divided into segments, wherein each segment has properties matching at least one type of element. In other words, a segment of an element may have any of the properties as discussed previously. For example, the segment may be divided such as to have a ratio between the initial segment area and a divided segment area being greater than 0 but less than 1.

In an embodiment of the present invention, the array is an n×m array. In a similar embodiment, neither n nor m is equal to 0 or 1. In a similar embodiment, n is equal to m such as to form a square array.

In its most general, the invention also provides a method of encoding data into the code as described within the specification.

In an embodiment of the present invention, the method has the steps of:
  generating a library of elements in accordance with the specification,
  identifying unique characters of the data to be encoded,
  assigning each unique character a unique element from the library of elements,
  transcribing the data to be encoded into the code, using the assigned library of elements.

In other words, having determined the data that is to be encoded, determining how many unique characters exist within the data. For example, if the data to be encoded was alphanumerical, 34 unique characters would be identified. In this example, 34 unique elements would be generated according to the specification and each of the 34 unique characters would be assigned a unique element. Therefore an equivalent system exists for representing the alphanumeric characters, and so the data can be encoded.

In its most general, the invention also provides a method of reading such codes as described above. The method having the steps of: validating each element and identifying each element.

In an embodiment of the method as presented in the present invention, the steps of reading the code are:
  optically capturing a representation of the code to be read using a device,
  identifying an orientation and element-area size of the code,
  partitioning the code into equal-area elements in accordance with the orientation and element-area size identified,
  validating the element through a predetermined validation method,
  sequentially identifying elements from a collection of known elements stored on the device via a predetermined identifying method.

In an embodiment, the predetermined validation method has the steps of:
  averaging a value of each of the equal-area elements,
  determining if the averaged value falls within a range defined by errors bars associated with a control value.

In an embodiment, the value to be averaged is one of, the exposure of the element, the pixel values of the element, the darkness of the element or the lightness of the element. In a similar embodiment the value to be averaged is the same type as the value used to validate an element (the control value).

The present invention also provides instructions to perform any of the method described above, such instructions being storable on a computer-readable storage medium and executable on an appropriate processor.

Embodiments of the present invention will now be described with reference to the accompanying drawings in which:

FIG. 1 shows a planar view of a prior art two dimension optical code

FIG. 2-a shows a planar view of an optical code according to an embodiment of the present invention. FIG. 2-b shows the same optical code divided into elements.

FIG. 3 shows a planar view of embodiments of elements of the first type according to the present invention.

FIG. 4-a and FIG. 4-b shows a planar view of embodiments of elements of the second type according to the present invention.

FIG. 5 shows an element according to the present invention divided into portions for identification.

FIG. 1. shows a prior art QR code, elements in the top left, right and bottom left corner represent control blocks for position, data is the encoded in a binary fashion in accordance to the QR code specification as disclosed in the ISO/IEC 18004:2006 specification.

FIG. 2-*a* shows an example of a code in accordance with the present invention. A 3×3 grid 200 formed of 9 elements 201 is shown, wherein the bottom right hand element is an anchor or orientation element. FIG. 2-*b* shows the division of the code into a grid of elements, wherein each element is plainly indicated, the grid lines shown in red are for illustrative purposes and may or may not be present in embodiments of the invention.

FIG. 3 shows elements of the first type according to the present invention, a black border is included for illustrative purposes and may or may not be present in embodiments of the invention.

FIG. 4-*a* shows elements of the second type according to the present invention, a black border is included for illustrative purposes. Each element has at least two portions 400, 401. FIG. 4-*b* again shows elements of the second type according to the present invention, wherein the elements are divided in a manner different to the elements in FIG. 4-*a*, however are still examples according to the present invention.

FIG. 5 shows an element divided into portions 500*a*, 500*b*, 500*c*, 500*d* for identification. The red grid lines are for illustrative purposes, to make clear how the element is divided and may or may not be present in embodiments of the invention.

Figure 6:
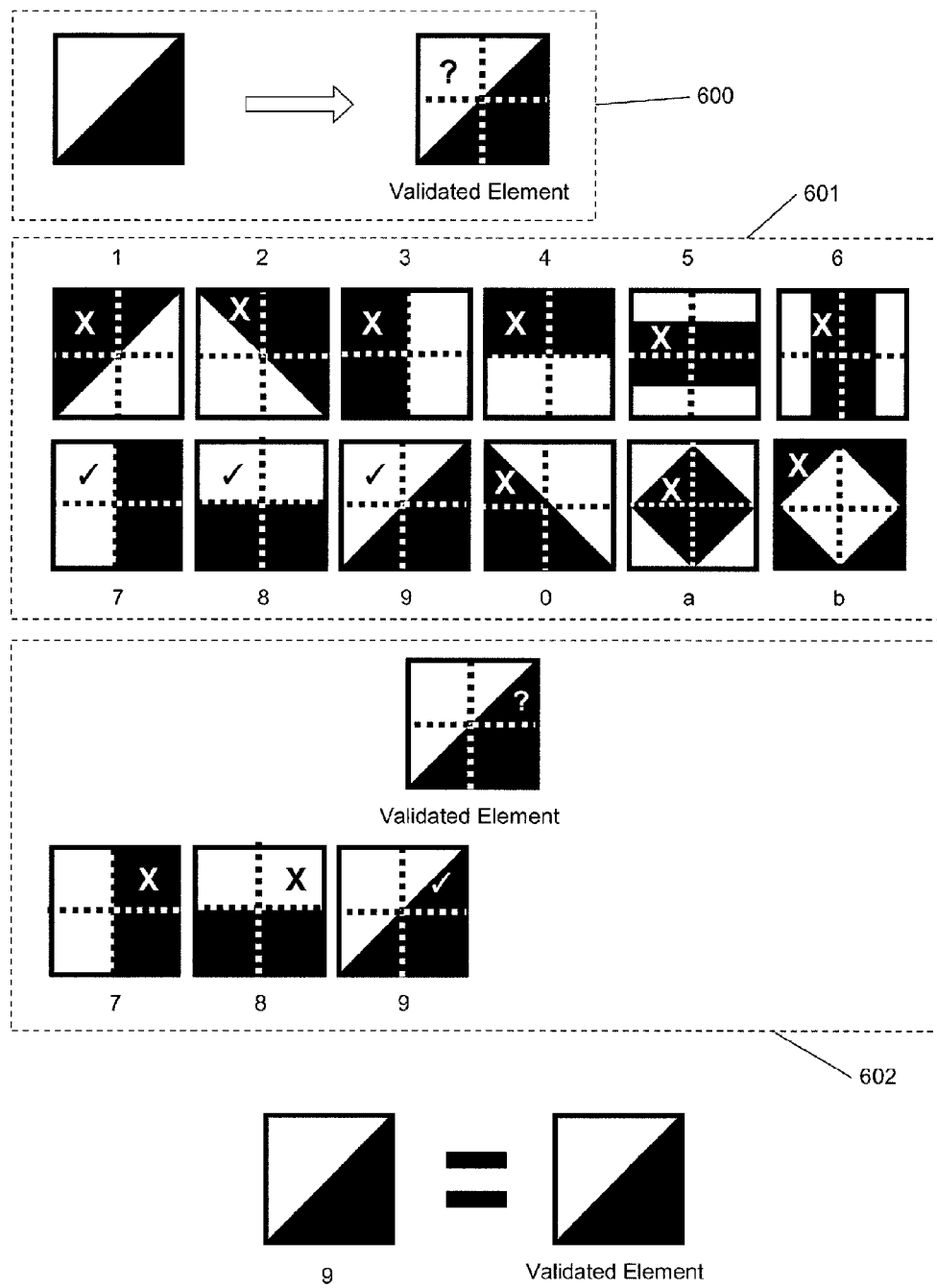
FIG. 6 shows the steps of identifying a validated element.

FIG. 6 shows the steps, 600, 601, 602, of identifying a validated but unidentified element, through dividing the unidentified element into portions, and sequentially comparing the portions to a selection of known elements.

Figure 7:
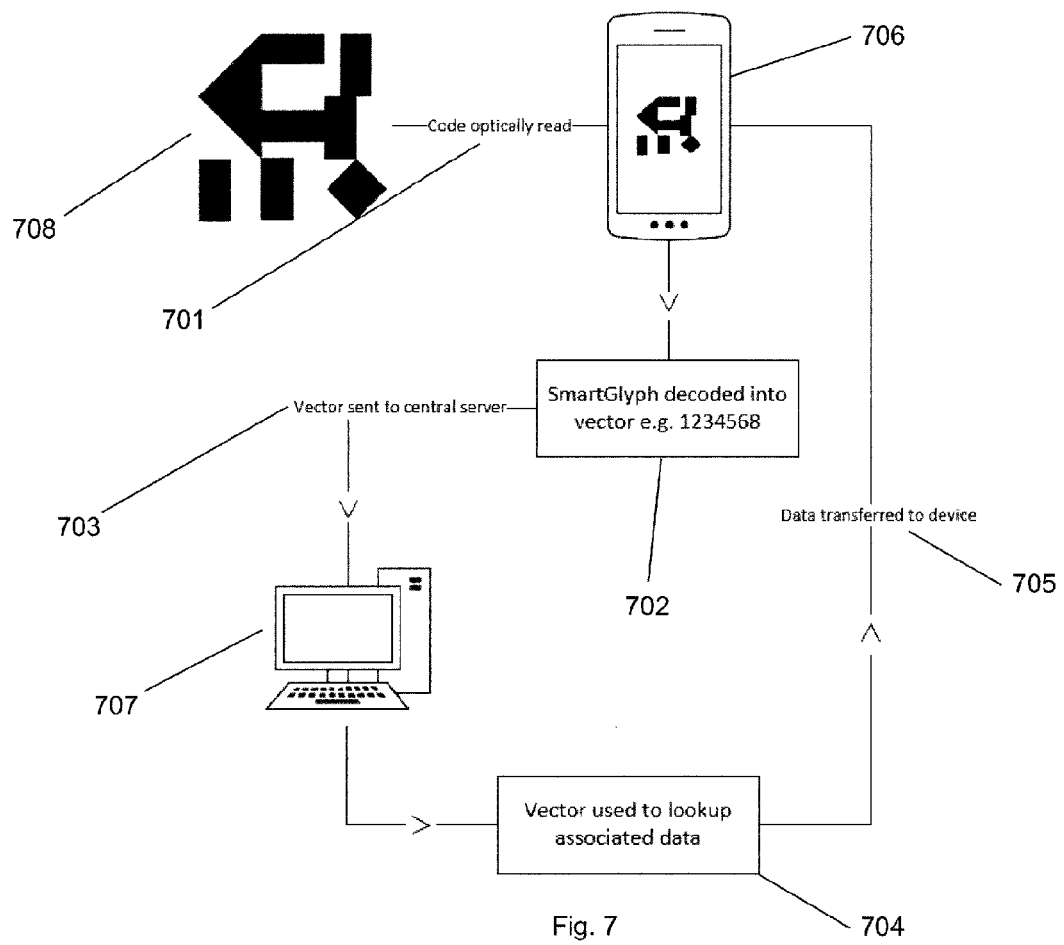
FIG. 7 shows the steps of retrieving associated data by a scanning device.

FIG. 7 shows the process of retrieving the active data associated with a SmartGlyph code, through communication between a central server and the scanning device via a network.

Structure of Code:

An embodiment of the present invention may be formed of an array 200 of equal-sized elements 201 in a grid as shown in FIG. 2. The grid may or may not be formed of an n×n or n×m array of elements. A code as shown in FIG. 2 may be referred to as a SmartGlyph.

Each element may represent a single data value, in the examples given the structure is used to encode base 10 numbers i.e. 1, 2, 3 etc.; however the skilled person will appreciate that any form of data can be encoded with the method of the present invention. The element may further represent an indivisible datum, in that the element cannot be divided into further elements containing encoded data.

In some representations of elements, a black border has been added to aid clarity; however this black border may or may not be present in an embodiment of the invention.

A first type of element is shown in FIG. 3, wherein the entirety of the area 300 of the element is a single colour.

Examples of second type of element are shown in FIG. 4, wherein there exists a division of the element 400 area into at least two portions 401, 402, each portion being a respective colour. Subsequent examples indicate that a portion may be a combination of sections of an element, each section being a same colour.

The elements of the second type are divided such as to have strongly contrasting portions; examples shown in FIG. 4-*a* are divided such as to have a 50/50 relation between the portions. The skilled person will of course appreciate that any division yielding a strong contrast can be utilised within the method of the invention. For example elements shown in FIG. 4-*b* are divided differently to those in FIG. 4-*a*, however a clear contrast is still present.

The elements may be divided such that at least one of the portions formed by the division is a simple shape. FIG. 4 demonstrates a selection of the simple shapes used, including circles, rectangles, triangles and rhombuses. The skilled person would appreciate that a number of possible shapes can be used, providing that they are readable by a scanning device.

An element may be used as an anchor and orientation element, in that it is used to define a point of reference on the grid for a scanning device to use. Such anchor elements may or may not be used to encode further data. Further, anchor elements may be placed in a corner of the array, in a preferred embodiment the anchor element is placed in the bottom right corner of the array.

Further, an element may be used as an indication of the type of active data associated with the code, for example an element may be used to indicate that the active data is a video. Through this type identification, more efficient manipulation of the code can be utilised, allowing the scanning device to be aware of the context in which the active data sits.

Reading of Code:

Due to the advantages of having a second type of element which presents a strongly contrasting image, reading of the code by a scanning device is simplified.

Due to this simplification, it has been shown that any camera with a resolution above 0.3 mega pixel is able to consistently, accurately, and quickly read a SmartGlyph, this being a vast improvement over the prior art.

Elements of a SmartGlyph are identified through a form of discrimination logic, i.e. identifying an element from a store of known elements through identifying which of the known elements the unknown element is not.

Validation

An initial step is the validation that the element to be identified is a valid element within the specification of the SmartGlyph code. Such validation has the following steps:

A scanning device capturing a digital representation of the element to be validated via optical means.

Processors on the scanning device averaging the pixel values of the digital representation of the element.

Comparing the average pixel value of the digital representation to a control value, the control value having associated error margins.

If the average pixel value of the digital representation falls within the range defined by the error margins of the control value, validating the element to then be read as a SmartGlyph code element.

It will of course be appreciated that other means of validation could be performed, such as exposure matching, fuzzy image matching etc.

These validation methods can be performed quickly and inexpensively (with relation to computational time), and show a marked improvement over the validation methods of the prior art which often require heavy computation to calculate checksums etc.

Identification

Having validated the element as fulfilling the requirements of the SmartGlyph technical specification, the element is then identified through the following steps:

(a) Dividing the validated but unidentified element into a number of segments.

(b) In a pre-defined manner, sequentially comparing the portions of the divided element to respective segments of known respective elements divided in the same fashion.

(c) If the segments compared match, retaining the respective elements for the next comparison in the sequence.

(d) Repeating the steps (b)-(c) until only a single known element remains.

(e) Identifying the unidentified element as the single remaining known element.

An example of this method is shown in FIG. 6. Step (a) is demonstrated in FIG. 6 by the division of the element into quadrants, it is of course clear that any arbitrary division may take place, so long as such division in consistent with relation to the known elements.

Steps (b)-(d) are demonstrated in FIG. 6, showing the elimination of known elements that have been identified as not matching the validated element. 600 shows the division of a validated but unidentified element into segments. 601 shows the comparison of a first segment (?) to the respective segments of the known elements stored within the scanning device. 602 shows the remaining elements, which have passed the comparison, being used in the next stage wherein the next segment in the sequence is compared. After this step, a single element is remaining (9) and hence the validated but unidentified element is now known to be element 9.

It will of course be appreciated that the means of comparison could be any of the well-known image recognition methods, e.g. direct image comparison, edge-finding, divide-and-conquer, greyscale matching, gradient matching, histograms of receptive field responses etc.

Encoding of Data

As discussed above, any form of data may be encoded utilizing the present invention. To do so, the unique characters required to represent the entirety of the data must be identified. For example, to store "1234321", four unique characters are required: 1, 2, 3 and 4. Hence, four unique elements must be generated, in accordance to the specification, wherein each element is assigned to a unique character. Having done this, there now exists an equivalent set of elements to represent the entirety of the data.

Implementation of Scanned Code

The present invention encodes arbitrary information into an optically readable format, dependent on the scanning device used; a same SmartGlyph could be read in innumerable ways dependent on the configuration of the scanning device.

In a preferred example, the SmartGlyph is used to encode numbers in base 10, each element being assigned a unique digit. The entire number, once read, is used to centrally lookup the data assigned to that SmartGlyph which is then transferred back to the scanning device. An example of this process is shown in FIG. 7.

In detail, FIG. 7 shows the steps of, optically capturing 701 the SmartGlyph 708, decoding 702, on the capturing device 706, the SmartGlyph into a vector. A vector in this case is used as an identifier of the active data stored on the central server 707. The vector is then sent 703 to the central server 707 via any suitable network. The central server 707 then uses the vector to lookup the associated active data 704. The active data is then transferred 705 to the capturing device 706 for presentation to the user.

Further, as the SmartGlyph code is interpreted by the scanning device, a number of options present themselves. For example, it would be possible to embed a control byte into the SmartGlyph, to indicate the type of active data associated with the scanned SmartGlyph. In an example, type 1 may indicate that the Smartglyph is a business card. Therefore, when the scanning device captures the SmartGlyph, a control byte, stored in the SmartGlyph, indicates to the scanning device that the active data is a "business card" type data. The scanning device is then able to open the appropriate application on the scanning device, prior to receiving any active data from the central servers.

The invention claimed is:

1. A two dimensional code consisting essentially of an array of equal-area elements, each element being the representation of a data value, wherein each element is one of the following types of element:
    a first type wherein the entire area of the element is a single colour; or
    a second type wherein the area is divided into two colours, each colour filling 50% of the element; and
    wherein the array has a plurality of the second type of elements and wherein at least one of the plurality of the second type of elements comprises a diagonal line and at least one other of the plurality of second type of elements comprises a line running from one side to an opposing side.

2. The code of claim 1, wherein the area of the second type of element is divided such that the two colours form a polygonal shape within the element.

3. The code of claim 1, wherein a plurality of the second type of elements comprises a diagonal line running from one corner to a diagonally opposite corner.

4. The code of claim 1, wherein the first colour is black and the second colour is white.

5. The code of claim 1, wherein the data stored within the code is not active data.

6. The code of claim 1, wherein any one of the plurality of second type elements may be divided into quarters and each quarter is itself either a first type of element or a second type of element.

7. A method for reading the code of claim 1, having the steps of:
    optically capturing a representation of the code to be read using a device,
    identifying an orientation and element-area size of the code,
    partitioning the code into equal-area elements in accordance with the orientation and element-area size identified,
    validating the element through a predetermined validation method,
    sequentially identifying elements from a collection of known elements stored on the device via predetermined identifying method.

8. The method of claim 7, wherein the predetermined method for validating the element has the steps of:
    averaging a value of each of the equal-area elements,
    determining if the averaged value falls within a range defined by error bars associated with a control value.

9. The method of claim 8, wherein the value to be averaged is one of, the exposure of the element, the pixel values of the element, the darkness of the element, the lightness of the element.

10. The method of claim 9, wherein the value to be averaged is the same type as the control value.

11. The code of claim 1, wherein the equal-area elements are square.

12. The code of claim 1, wherein a plurality of the second type of elements comprises a diagonal line running from one sidewall to an adjacent side wall.

13. A system comprising:
a code according to claim 1;
a scanning device; and
a data server;
wherein, when scanned by the scanning device, the code is decoded to provide a vector, which is then used to lookup data on the data server assigned to that vector and the data is transferred back to the scanning device.

14. A system according to claim 13, wherein the vector is an identifier of active data stored on the data server and, once contact with the data server is established, the vector is used to lookup the active data and the active data is then transferred to the scanning device.

\* \* \* \* \*